US011747078B1

(12) United States Patent
Schulze et al.

(10) Patent No.: US 11,747,078 B1
(45) Date of Patent: Sep. 5, 2023

(54) CONDENSING UNIT COMPRESSOR MOUNTING

(71) Applicant: Emerson Climate Technologies, Inc., Sidney, OH (US)

(72) Inventors: Scott D. Schulze, Troy, OH (US); Thomas D. Richard, Minster, OH (US)

(73) Assignee: Copeland LP, Sidney, OH (US)

( * ) Notice: Subject to any disclaimer, the term of this patent is extended or adjusted under 35 U.S.C. 154(b) by 0 days.

(21) Appl. No.: 18/093,555

(22) Filed: Jan. 5, 2023

(51) Int. Cl.
   *F25D 23/00* (2006.01)
   *B23P 19/04* (2006.01)
   *F25D 19/04* (2006.01)

(52) U.S. Cl.
   CPC ............ *F25D 23/006* (2013.01); *B23P 19/04* (2013.01); *F25D 19/04* (2013.01)

(58) Field of Classification Search
   CPC ........ B23P 19/04; F25D 23/006; F25D 19/04; F16B 25/00; F16B 25/0031; F16B 25/0015; F16B 25/0021; F16B 21/16; F16B 21/18; F16B 21/186
   See application file for complete search history.

(56) References Cited

U.S. PATENT DOCUMENTS

| 4,490,991 A * | 1/1985 | Griffin .................... F25D 21/14 62/448 |
| 4,577,402 A * | 3/1986 | Swanstrom ......... H01L 23/4006 361/720 |
| 6,751,973 B2 | 6/2004 | Erisgen |
| 6,925,820 B2 * | 8/2005 | Erisgen ................. A47F 3/0482 62/115 |

FOREIGN PATENT DOCUMENTS

| CN | 211316367 U | | 8/2020 | |
| CN | 214469568 U | | 10/2021 | |
| GB | 784903 A | * | 6/1954 | ........... F25D 23/062 |
| GB | 784903 A | | 10/1957 | |
| KR | 20030045273 A | * | 6/2003 | |

* cited by examiner

*Primary Examiner* — Bayan Salone
(74) *Attorney, Agent, or Firm* — Harness, Dickey & Pierce, P.L.C.; Anthony G. Fussner (57) ABSTRACT

Exemplary embodiments are disclosed of methods, systems, and assemblies including threaded mechanical fasteners (e.g., threaded studs or screws, etc.) and retention members (e.g., clips, etc.) for mounting condensing unit compressors selectively and/or interchangeably to either metal condensing unit bases or plastic condensing unit bases.

21 Claims, 12 Drawing Sheets

CONDENSING UNIT COMPRESSOR MOUNTING

FIELD

The present disclosure relates to mounting condensing unit compressors to condensing unit bases.

BACKGROUND

This section provides background information related to the present disclosure which is not necessarily prior art.

Figure 1:
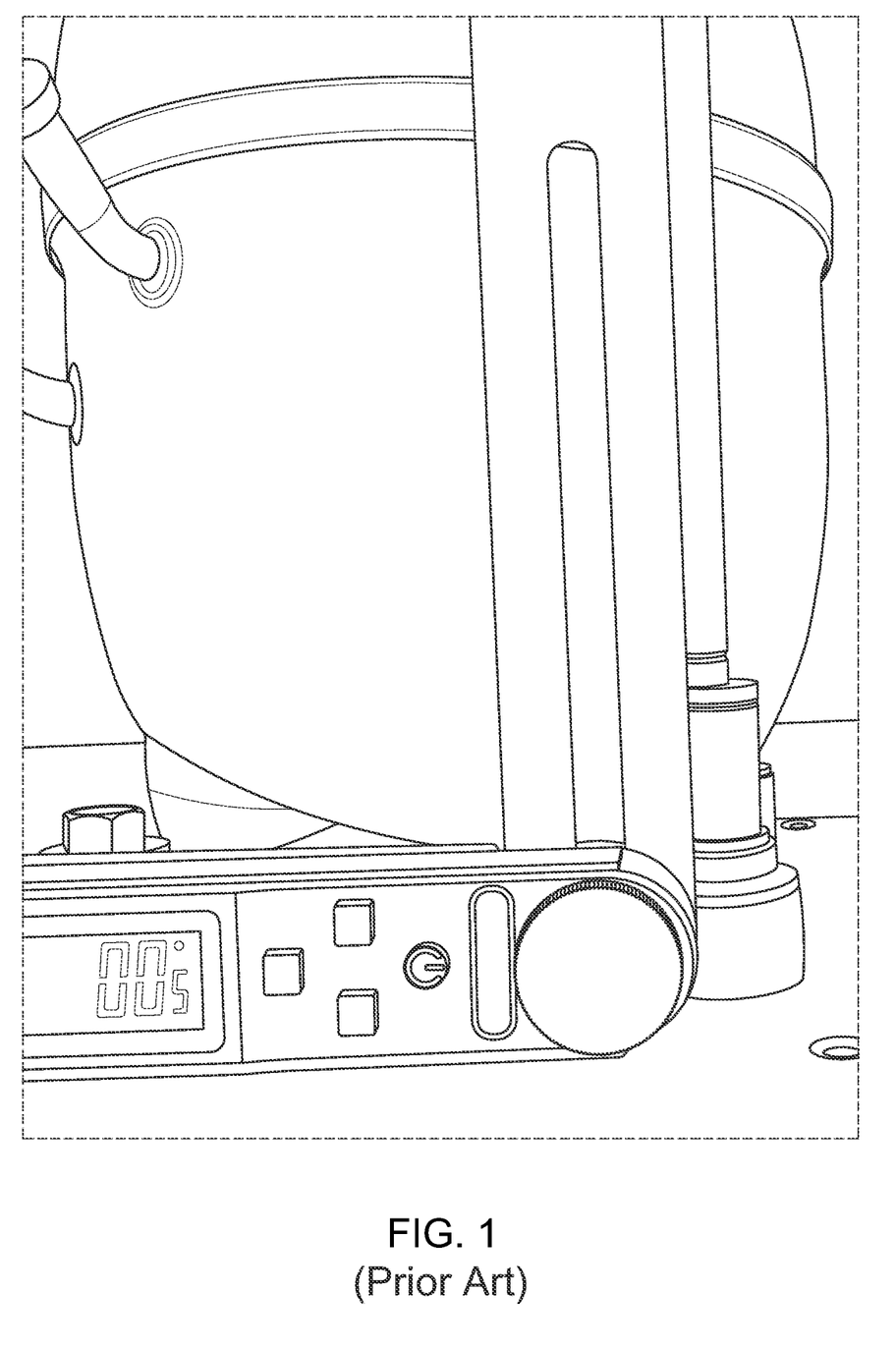
FIG. 1 illustrates a conventional mounting of a condensing unit compressor to a steel base of a condensing unit.
Figure 2:
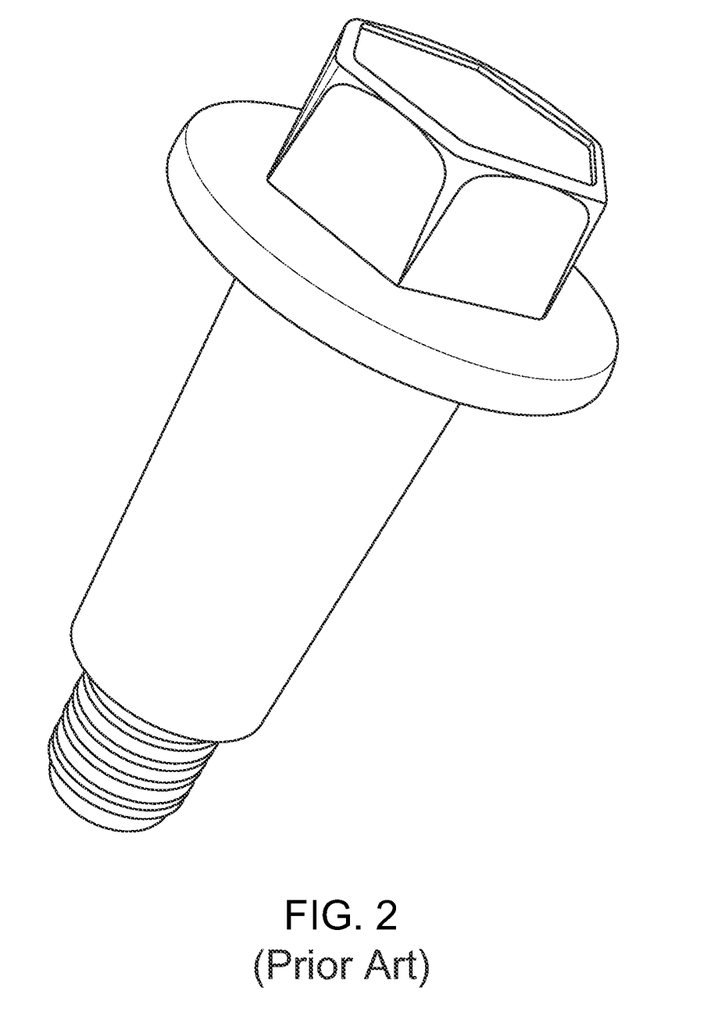
FIG. 2 illustrates a conventional mounting screw or bolt that may be used for mounting a condensing unit compressor to a base of the condensing unit.

On conventional condensing units, the compressor is assembled to the base by using four mounting bolts aligned vertically and fastened from the top down. For example, FIG. 1 illustrates a conventional method of mounting a condensing unit compressor to the condensing unit base using a standard mounting screw or bolt as shown in FIG. 2. The condensing unit base may include mounting studs that come up from the bottom of the base.

DRAWINGS

The drawings described herein are for illustrative purposes only of selected embodiments and not all possible implementations and are not intended to limit the scope of the present disclosure.

Corresponding reference numerals may indicate corresponding (though not necessarily identical) features throughout the several views of the drawings.

DETAILED DESCRIPTION

Example embodiments will now be described more fully with reference to the accompanying drawings.

As recognized herein, there are many existing condensing units with steel and plastic bases in production and in the field, such that it would be advantageous to develop mounting solutions that would allow condensing unit compressors to be assembled to existing bases without requiring changes to the existing bases. After recognizing the above, exemplary embodiments were developed and/or are disclosed herein that include studs or screws (broadly, mechanical fasteners) that are threaded, thereby allowing the studs to be used on either a steel or plastic condensing unit base, which is configured to accept threads from a mounting bolt.

Figure 3:
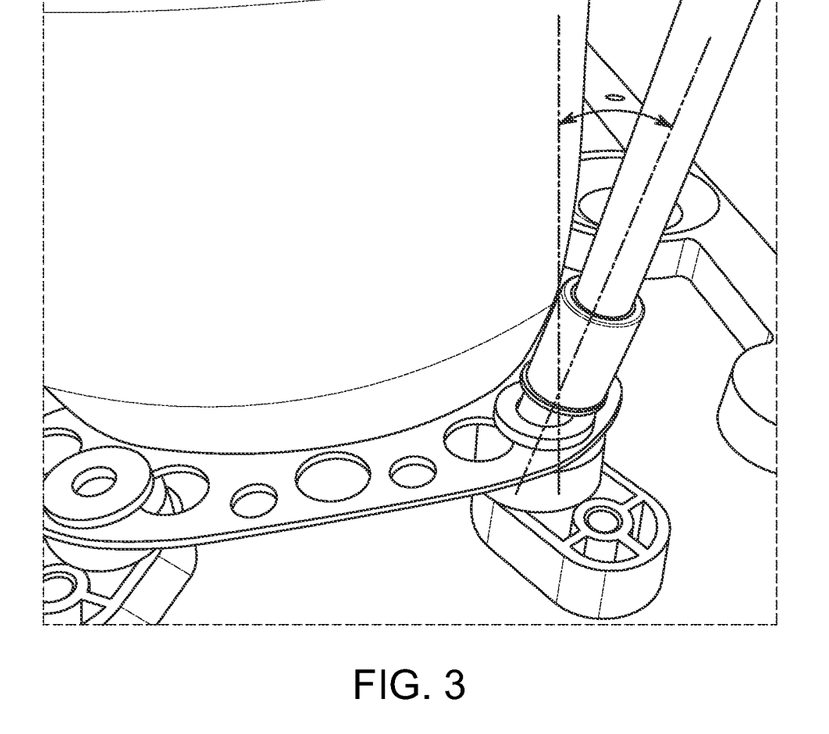
FIG. 3 illustrates a conventional condensing unit compressor having a compressor shell that is too close to the compressor mounting foot to allow the compressor to be mounted to the condensing unit base using the mounting screw shown in FIG. 2. The dashed line in FIG. 3 illustrates the challenges posed when trying to assemble the compressor to the base via the conventional mounting screw in FIG. 2 and technique due to the closeness of the compressor shell to the compressor mounting foot.

By using a threaded stud, the technology of the clip can be used without the burden of releasing and tooling new bases to accommodate the threaded stud and without the burden of having to carry alternate part numbers (p/n's) and inventory in the manufacturing plant. The threaded studs (e.g., stud 100 (FIG. 4), stud 200 (FIG. 7), stud 300 (FIG. 10), etc.) disclosed herein also allow for much easier compressor field replacements as the threaded studs are compatible with existing condensing unit bases. Advantageously, exemplary embodiments disclosed herein may be configured for installation and use on either a plastic base or metal base and installable from the top. Exemplary embodiments include self-tapping thread forming screws, which may eliminate the need to have tapped holes other than just one hole for clearance. In addition, exemplary embodiments resolve the issue of assembling a compressor to a base when the compressor shell is too close to the compressor mounting holes to allow for assembly via conventional mounting bolts as discussed above and shown in FIGS. 2 and 3.

Figure 4:
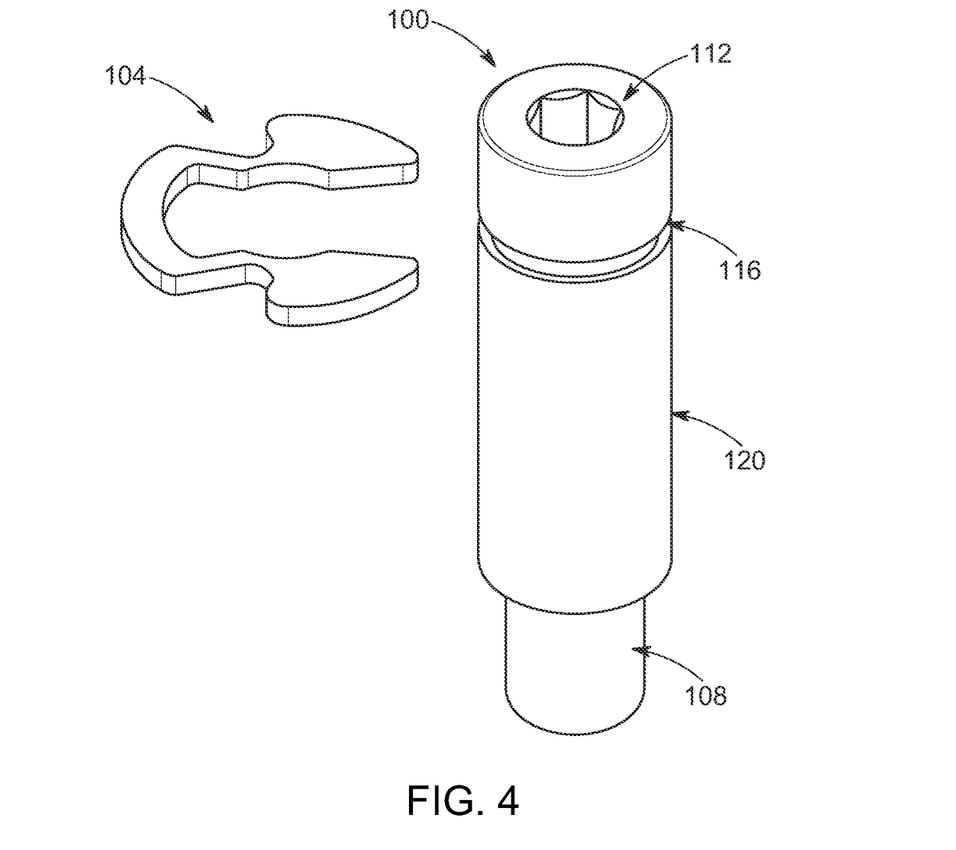
FIG. 4 is a perspective view of a threaded stud or screw (broadly, a mechanical fastener) and a removable clip (broadly, a retention member) configured to be usable for assembling a condensing unit compressor to either a steel or plastic condensing unit base according to an exemplary embodiment of the present disclosure.
Figure 5:
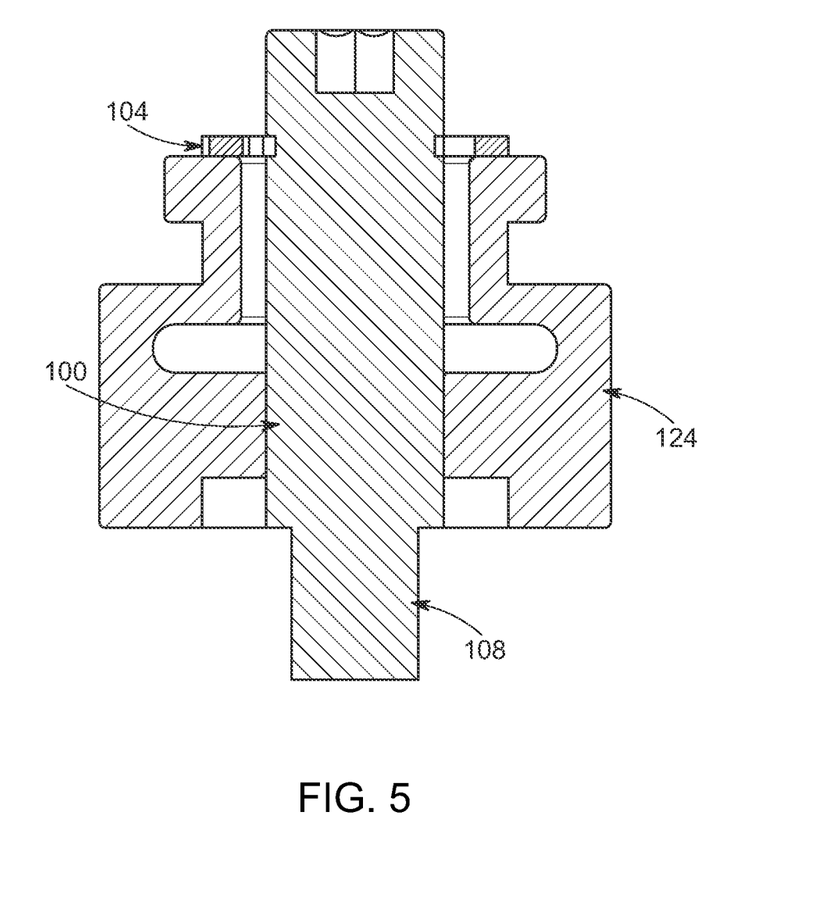
FIG. 5 is a cross-sectional side view of the threaded stud and removable clip shown in FIG. 4 and also illustrating a grommet (e.g., rubber grommet, etc.).

FIG. 4 illustrates a threaded stud or screw 100 (broadly, a mechanical fastener) and a removable clip 104 (broadly, a retention member) (e.g., snap ring or clip, etc.) configured to be usable for assembling a condensing unit compressor to either a steel or plastic condensing unit base according to an exemplary embodiment of the present disclosure. As shown, the stud 100 includes a lower threaded portion 108 and an internal socket 112 (broadly, a torque tool reception site) along the top for torquing (e.g., via a hexagonal wrench, etc.) the threaded portion 108 of the stud 100 into a fastener hole of the metal or plastic condensing unit base. The stud 100 includes a groove 116 configured to engagingly receive and hold the clip 104, which, in turn, is used to hold or retain the compressor. The stud 100 also includes a shoulder portion 120 between the groove 116 and the lower threaded portion 108.

Figure 6:
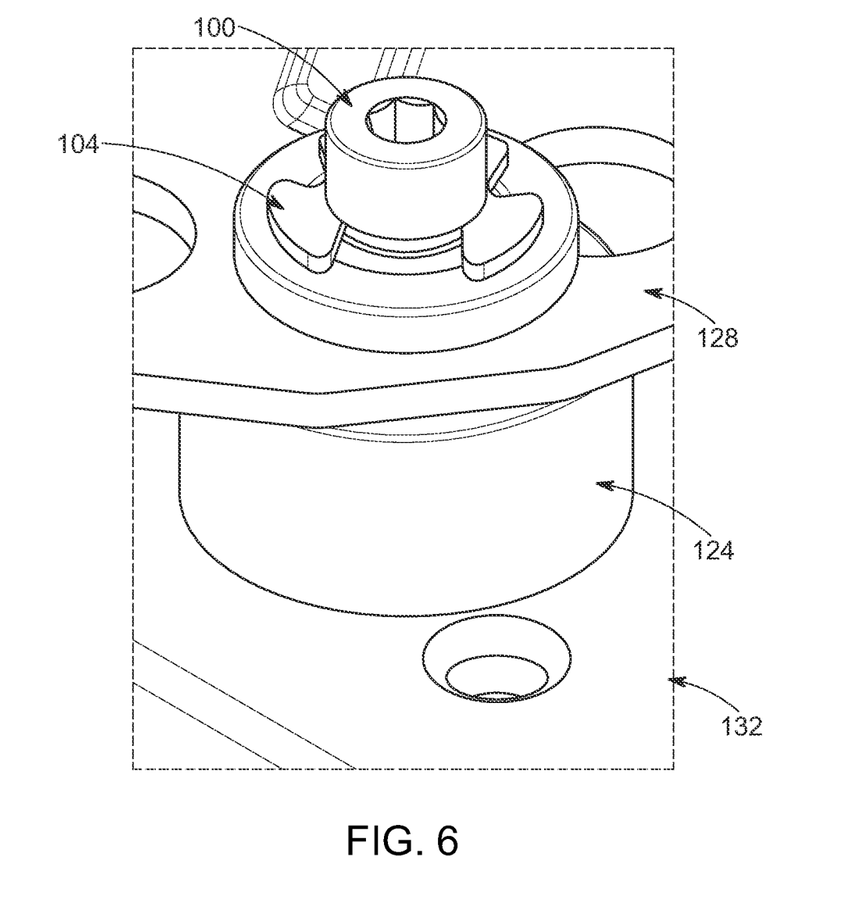
FIG. 6 is an upper perspective view of the threaded stud and removable clip shown in FIG. 4 after being assembled with a condensing unit compressor and condensing unit base according to exemplary embodiments of the present disclosure.

FIG. 6 illustrates the stud 100 and removable clip 104 assembled with a grommet 124 (e.g., rubber grommet, etc.), condensing unit compressor 128, and condensing unit base 132. The process for assembling the condensing unit compressor 128 to the condensing unit base 132 generally includes threadedly fastening four threaded studs 100 to the condensing unit base 132, adding grommets 124 (e.g., rubber grommets, etc.) to the condensing unit compressor 128, mounting the compressor/grommets along the top of the threaded studs 100, and adding a clip 104 into the groove 116 of each of the four studs 100 to thereby secure the compressor/grommet to the condensing unit base 132.

Figure 7:
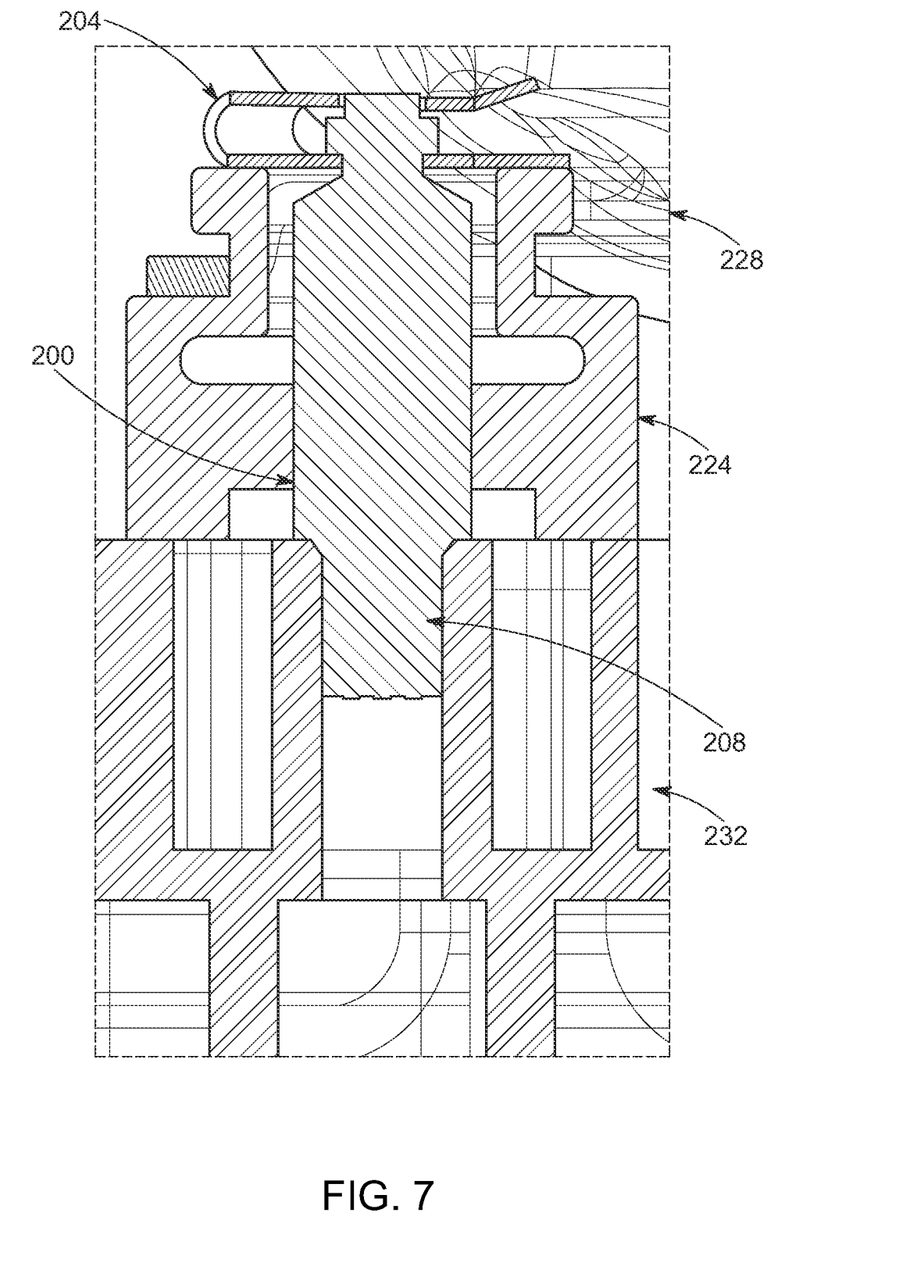
FIGS. 7 and 8 are a cross-sectional side view and a perspective view, respectively, of a threaded stud or screw (broadly, a mechanical fastener) and a removable clip assembled with a condensing unit compressor and condensing unit base according to exemplary embodiments of the present disclosure.
Figure 8:
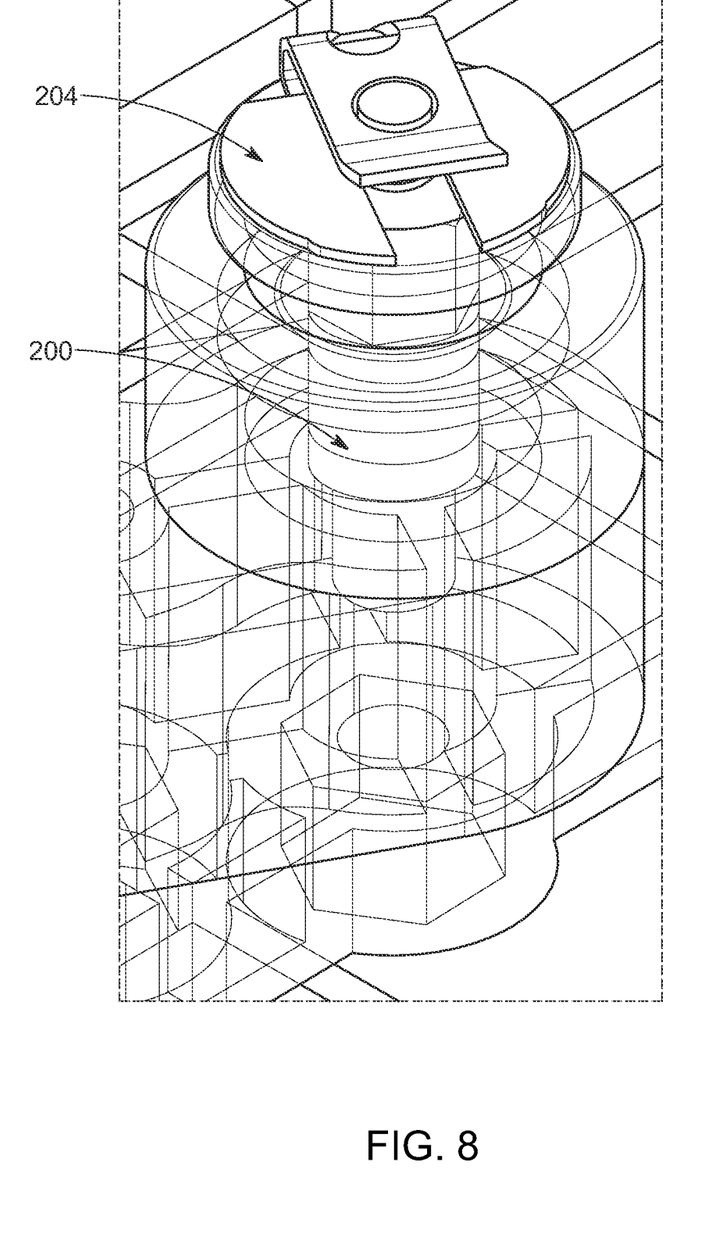

FIG. 7 illustrates a threaded stud or screw 200 (broadly, a mechanical fastener) and a removable clip 204 configured to be usable for assembling a condensing unit compressor/grommet to a metal or plastic base of the condensing unit according to an exemplary embodiment of the present disclosure. A condensing unit compressor 228 may be assembled onto a condensing unit base 212 by fastening the threaded portions 208 of four studs 200 to the condensing unit base 232, adding grommets 224 (e.g., rubber grommets, etc.) to the condensing unit compressor 228, mounting the compressor/grommets along the top of the threaded studs 200, and adding a clip 204 into the groove 216 of each of the four studs 200 to thereby secure the compressor/grommet to the condensing unit base 232.

Figure 9:
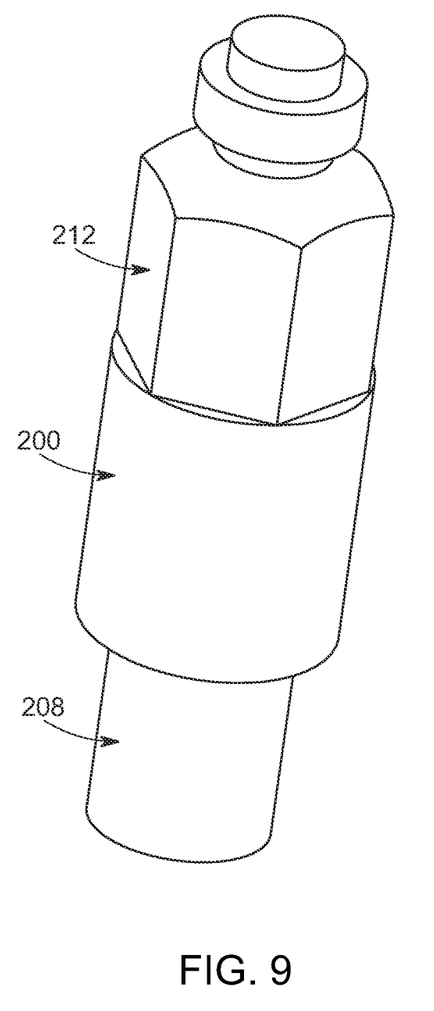
FIG. 9 is a perspective view of the threaded stud or screw shown in FIGS. 7 and 8 without the removable clip.

As shown in FIG. 9, the threaded stud or screw 200 includes a hexagonal portion 212 (broadly, a torque tool reception site) that is relatively large and located for easier assembly. The hexagonal portion 212 is usable for torquing (e.g., via a wrench, etc.) the threaded portion 208 of the stud 200 to the condensing unit base.

Figure 10:
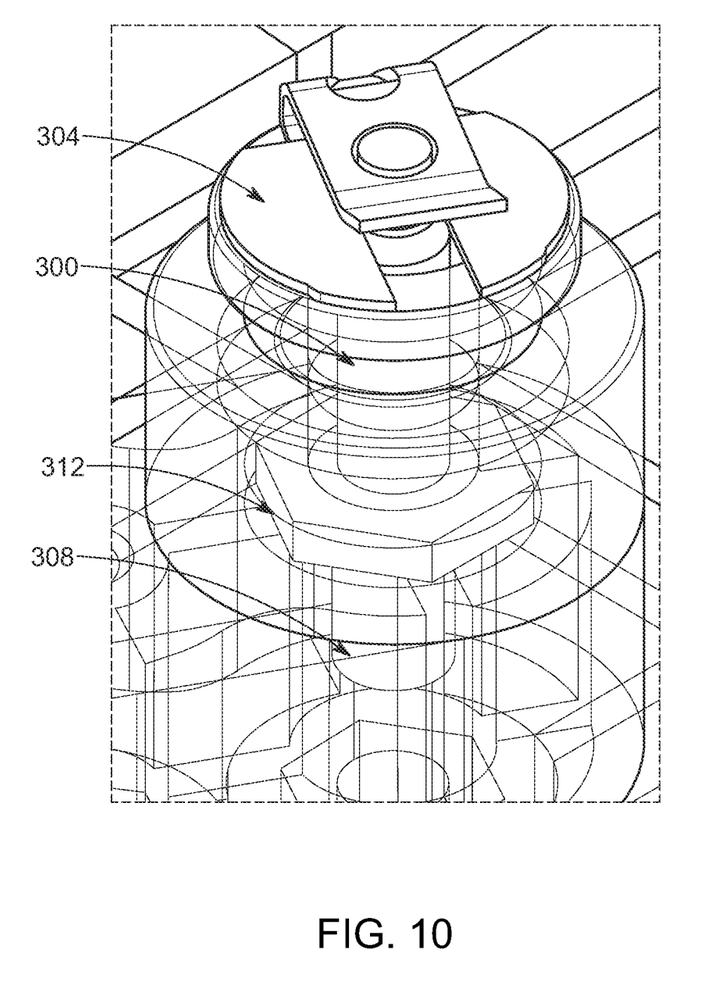
FIG. 10 is a perspective view of a threaded stud or screw (broadly, a mechanical fastener) and a removable clip assembled with a condensing unit compressor and condensing unit base according to exemplary embodiments of the present disclosure.

FIG. 10 illustrates a threaded stud or screw 300 (broadly, a mechanical fastener) and a removable clip 304 configured to be usable for assembling a condensing unit compressor to a metal or plastic base of the condensing unit according to an exemplary embodiment of the present disclosure. As shown, the threaded stud 300 includes a hexagonal portion 312 (broadly, a torque tool reception site) located along or above a lower portion of the threaded stud 300 that sets the threaded engagement of the stud's threaded portion 308 into the condensing unit base. The hexagonal portion 312 is usable for torquing (e.g., via a wrench, etc.) the threaded portion 308 of the stud 300 to the condensing unit base.

Exemplary embodiments disclosed herein may be used as a mounting solution with any condensing unit including a hermetic compressor for refrigeration and/or A/C. By way of example, exemplary embodiments may be used as a solution for mounting the compressor shown in FIG. 1 or FIG. 3, a Secop compressor, an M-line unit with a hermetic compressor, an Embraco compressor, etc. on either a plastic base (e.g., plastic base 132 shown in FIG. 11, etc.) or a metal base (e.g., base 132 shown in FIG. 12, etc.).

Figure 11:
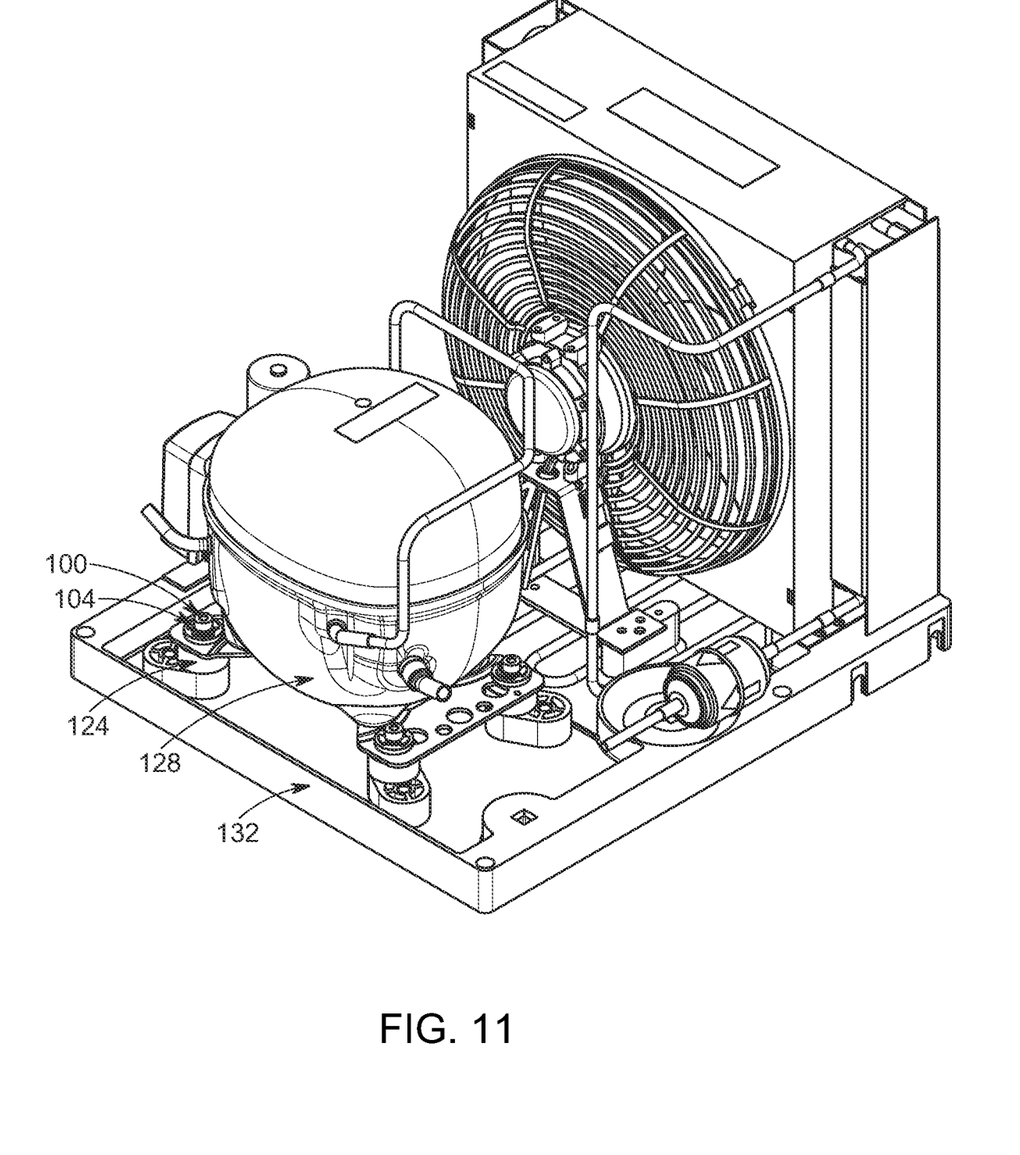
FIG. 11 is a perspective view of a condensing unit compressor mounted to a plastic condensing unit base by using four threaded studs and removable clips as shown in FIG. 4.
Figure 12:
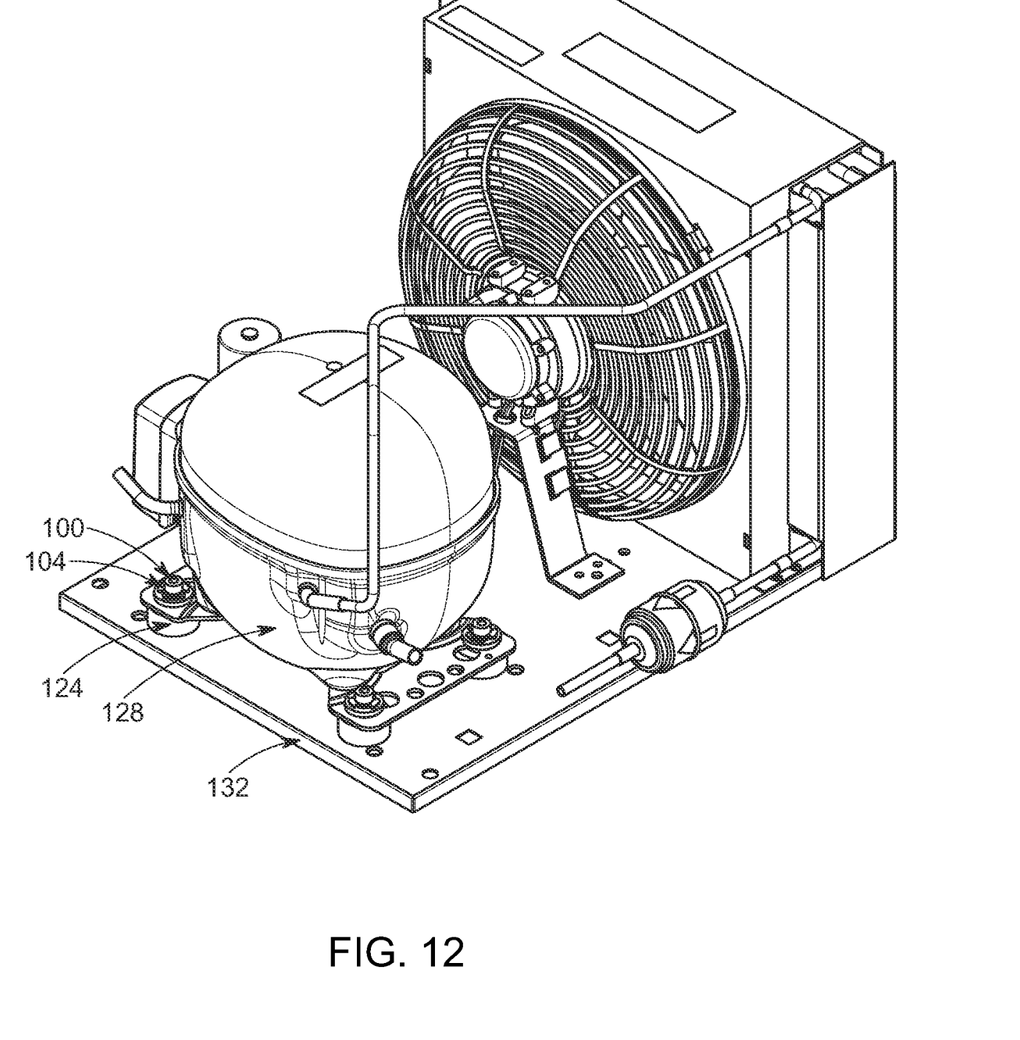
FIG. 12 is a perspective view of a compressor mounted to a metal base of a condensing unit by using four threaded studs and removable clips as shown in FIG. 4.

For example, FIG. 11 illustrates an exemplary condensing unit compressor 128 mounted to a plastic condensing unit base 132 by using four threaded studs 100 and removable clips 104 as shown in FIG. 4. As another example, FIG. 12 illustrates an exemplary condensing unit compressor 128 mounted to a metal condensing unit base 132 by using four threaded studs 100 and removable clips 104 as shown in FIG. 4.

The process for assembling the condensing unit compressor 128 to the plastic or metal condensing unit base 132 generally includes threadedly fastening four threaded studs 100 into openings (e.g., pre-drilled or preformed holes, etc.) in the plastic or metal condensing unit base 132. The threaded studs 100 may be self-tapping such that the threaded studs 100 form tapping threads as the threaded studs 100 are driven (e.g., via a torque tool, etc.) into the openings of the plastic or metal condensing unit base 132.

Or the openings of the plastic or metal condensing unit base 132 may already be threaded before the threaded studs 100 are threadedly fastened into to the plastic or metal condensing unit 132. In which case, the threaded studs 100 are inserted into and threadedly fastened into the pre-threaded openings of the plastic or metal condensing unit base 132.

After the threaded studs 100 are fastened to the plastic or metal condensing unit base 132, grommets 124 (e.g., rubber grommets, etc.) are added to the condensing unit compressor 128 and the compressor/grommets are assembled or mounted along the top of the threaded studs 100. Clips 104 are then added into the grooves 116 of the studs 100 to thereby secure the compressor/grommet to the plastic or metal condensing unit base 132.

Disclosed herein are exemplary methods for mounting a condensing unit compressor to either a metal condensing unit base or a plastic condensing unit base. In exemplary embodiments, the method comprises: selecting one of the metal condensing unit base or the plastic condensing unit base; threadedly fastening at least one threaded mechanical fastener into the selected one of the metal condensing unit base or the plastic condensing unit base; assembling the condensing unit compressor onto the at least one threaded mechanical fastener; and removably coupling at least one retention member to the at least one threaded mechanical fastener to thereby retain the condensing unit compressor to the selected one of the metal condensing unit base or the plastic condensing unit base. The at least one threaded mechanical fastener and the at least one retention member enable the condensing unit compressor to be selectively, interchangeably mountable to either the metal condensing unit base or the plastic condensing unit base.

In exemplary embodiments of the method, assembling the condensing unit compressor onto the at least one threaded mechanical fastener comprises: adding at least one grommet to the condensing unit compressor; and assembling the at least one grommet and the condensing unit compressor onto the at least one threaded mechanical fastener. The at least one retention member removably coupled to the at least one threaded mechanical fastener secures the at least one grommet and the condensing unit compressor to the selected one of the metal condensing unit base or the plastic condensing unit base.

In exemplary embodiments of the method, the at least one threaded mechanical fastener includes four threaded mechanical fasteners. The at least one retention member includes four retention members each configured to be removably coupled to a corresponding one of the four threaded mechanical fasteners. The method includes: threadedly fastening each of the four threaded mechanical fasteners into the selected one of the metal condensing unit base or the plastic condensing unit base; assembling the condensing unit compressor onto the four threaded mechanical fasteners; and removably coupling each of the four retention members to the corresponding one of the four threaded mechanical fasteners to thereby retain the condensing unit compressor to the selected one of the metal condensing unit base or the plastic condensing unit base. The four threaded mechanical fasteners and the four retention members enable the condensing unit compressor to be selectively, interchangeably mountable to either the metal condensing unit base or the plastic condensing unit base.

In exemplary embodiments of the method, the at least one threaded mechanical fastener is configured to be self-tapping. And threadedly fastening the at least one threaded mechanical fastener into the selected one of the metal condensing unit base or the plastic condensing unit base comprises driving the at least one threaded mechanical fastener into at least one opening in the selected one of the metal condensing unit base or the plastic condensing unit base such that the at least one threaded mechanical fastener forms tapping threads in the at least one opening as the at least one threaded mechanical fastener is driven into the at least one opening.

In exemplary embodiments of the method, threadedly fastening the at least one threaded mechanical fastener into the selected one of the metal condensing unit base or the plastic condensing unit base comprises: engaging a torque tool with a torque tool reception site of the at least one threaded mechanical fastener; and using the torque tool to drive the at least one threaded mechanical fastener into at least one opening in the selected one of the metal condensing unit base or the plastic condensing unit base. The torque tool reception site may comprise an internal socket along a top of the at least one threaded mechanical fastener; and/or the torque tool reception site may comprise a hexagonal portion above a threaded portion of the at least one threaded mechanical fastener.

In exemplary embodiments of the method, the at least one threaded mechanical fastener comprises a stud having a threaded lower portion and an upper portion including a groove. And the at least one retention member comprises a clip configured to be engagingly received within the groove along the upper portion of the stud.

In exemplary embodiments of the method, the at least one threaded mechanical fasteners comprises a plurality of threaded mechanical fasteners. The at least one retention member comprises a plurality of retention members. And the method includes: selecting a first condensing unit compressor from a plurality of condensing unit compressors; using at least a first threaded mechanical fastener of the plurality of threaded mechanical fasteners and at least a first retention member of the plurality of retention members to mount the first condensing unit compressor to the metal condensing unit base; selecting a second condensing unit compressor from the plurality of condensing unit compressors having the same configuration as the first condensing unit compressor; and using at least a second threaded mechanical fastener of the plurality of threaded mechanical fasteners and at least a second retention member of the plurality of retention members to mount the second condensing unit compressor to the plastic condensing unit base.

Also disclosed herein are exemplary systems for mounting a condensing unit compressor to either a metal condensing unit base or a plastic condensing unit base. In exemplary embodiments, the system comprises at least one threaded mechanical fastener including an upper portion and a lower threaded portion. The lower threaded portion is configured to be threadedly fastened into a selected one of the metal condensing unit base or the plastic condensing unit base. The upper portion is configured to be received within an opening of the condensing unit compressor when assembled onto the at least one threaded mechanical fastener. At least one retention member is configured to be removably coupled to the upper portion of the at least one threaded mechanical fastener that protrudes outwardly above the condensing unit compressor when assembled onto the at least one threaded mechanical fastener, to thereby retain the condensing unit compressor to the selected one of the metal condensing unit base or the plastic condensing unit base. The at least one threaded mechanical fastener and the at least one retention member enable the condensing unit compressor to be selectively, interchangeably mountable to either the metal condensing unit base or the plastic condensing unit base.

In exemplary embodiments, the system includes at least one grommet including an opening configured to receive the lower threaded portion of the at least one threaded mechanical fastener therethrough. The grommet is configured to be positionable between the condensing unit compressor and the selected one of the metal condensing unit base or the plastic condensing unit base. The at least one retention member removably coupled to the at least one threaded mechanical fastener is operable for securing the at least one grommet and the condensing unit compressor to the selected one of the metal condensing unit base or the plastic condensing unit base.

In exemplary embodiments, the at least one threaded mechanical fastener includes four threaded mechanical fasteners. And the at least one retention member includes four retention members each configured to be removably coupled to a corresponding one of the four threaded mechanical fasteners. The four threaded mechanical fasteners and the four retention members enable the condensing unit compressor to be selectively, interchangeably mountable to either the metal condensing unit base or the plastic condensing unit base.

In exemplary embodiments, the at least one threaded mechanical fastener is configured to be self-tapping such that the at least one threaded mechanical fastener forms tapping threads in at least one opening in the selected one of the metal condensing unit base or the plastic condensing unit base as the at least one threaded mechanical fastener is driven into the at least one opening.

In exemplary embodiments, the at least one threaded mechanical fastener includes a torque tool reception site configured to be engaged by a torque tool for driving the at least one threaded mechanical fastener into at least one opening in the selected one of the metal condensing unit base or the plastic condensing unit base. The torque tool reception site may comprise an internal socket along a top of the at least one threaded mechanical fastener; and/or the torque tool reception site may comprise a hexagonal portion above the lower threaded portion of the at least one threaded mechanical fastener.

In exemplary embodiments, the at least one threaded mechanical fastener comprises a stud including the threaded lower portion and the upper portion including a groove. And the at least one retention member comprises a clip configured to be engagingly received within the groove along the upper portion of the stud.

In exemplary embodiments, the at least one threaded mechanical fastener includes four threaded mechanical fasteners. The at least one retention member includes four clips each configured to be engagingly received within a groove along the upper portion of a corresponding one of the four threaded mechanical fasteners. The system comprises four grommets. Each grommet includes an opening configured to receive the lower threaded portion of a corresponding one of the four threaded mechanical fasteners therethrough. Each grommet is configured to be positionable between the condensing unit compressor and the selected one of the metal condensing unit base or the plastic condensing unit base. Each threaded mechanical fastener is configured to be self-tapping to thereby form tapping threads in a corresponding opening in the selected one of the metal condensing unit base or the plastic condensing unit base as the threaded mechanical fastener is driven into the corresponding opening. Each threaded mechanical fastener includes a torque tool reception site configured to be engaged by a torque tool for driving the threaded mechanical fastener into the corresponding opening in the selected one of the metal condensing unit base or the plastic condensing unit base.

In exemplary embodiments, a condensing unit comprising a metal or plastic base and a compressor mountable to the metal or plastic base by a plurality of threaded mechanical fasteners and a plurality of retention members. Each threaded mechanical fastener includes an upper portion and a lower threaded portion. The lower threaded portion is configured to be threadedly fastened into the metal or plastic base. The upper portion is configured to be received within an opening of the condensing unit compressor when assembled onto the threaded mechanical fastener. Each retention member is configured to be removably coupled to the upper portion of a corresponding one of the plurality of threaded mechanical fasteners that protrudes outwardly above the condensing unit compressor when assembled onto the threaded mechanical fasteners, to thereby retain the condensing unit compressor to the metal or plastic base. The plurality of threaded mechanical fasteners and the plurality of retention members enable the condensing unit compressor to be selectively, interchangeably mountable to either a metal condensing unit base or a plastic condensing unit base.

In exemplary embodiments, the plurality of threaded mechanical fasteners includes four threaded mechanical fasteners. The plurality of retention members includes four clips each configured to be engagingly received within a groove along the upper portion of a corresponding one of the four threaded mechanical fasteners. The condensing unit comprises four grommets. Each grommet includes an opening configured to receive the lower threaded portion of a corresponding one of the four threaded mechanical fasteners therethrough. Each grommet is configured to be positionable between the condensing unit compressor and the metal or plastic base. Each threaded mechanical fastener is configured to be self-tapping to thereby form tapping threads in a corresponding opening in the metal or plastic base as the threaded mechanical fastener is driven into the corresponding opening. Each threaded mechanical fastener includes a torque tool reception site configured to be engaged by a torque tool for driving the threaded mechanical fastener into the corresponding opening in the metal or plastic base.

Example embodiments are provided so that this disclosure will be thorough and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a", "an" and "the" may be intended to include the plural forms as well, unless the context clearly indicates otherwise. The terms "comprises," "comprising," "includes," "including," "has," "have," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on", "engaged to", "connected to" or "coupled to" another element or layer, it may be directly on, engaged, connected, or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The term "about" when applied to values indicates that the calculation or the measurement allows some slight imprecision in the value (with some approach to exactness in the value; approximately or reasonably close to the value; nearly). If, for some reason, the imprecision provided by "about" is not otherwise understood in the art with this ordinary meaning, then "about" as used herein indicates at least variations that may arise from ordinary methods of measuring or using such parameters. For example, the terms "generally", "about", and "substantially" may be used herein to mean within manufacturing tolerances.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer, or section. Terms such as "first," "second," and other numerical terms when used herein do not imply a sequence or order unless clearly indicated by the context. Thus, a first element, component, region, layer, or section discussed below could be termed a second element, component, region, layer, or section without departing from the teachings of the example embodiments.

Spatially relative terms, such as "inner," "outer," "beneath", "below", "lower", "above", "upper" and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements, intended or stated uses, or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method for mounting a condensing unit compressor to either a metal condensing unit base or a plastic condensing unit base, the method comprising:
   selecting one of the metal condensing unit base or the plastic condensing unit base;
   threadedly fastening at least one threaded mechanical fastener into the selected one of the metal condensing unit base or the plastic condensing unit base;
   assembling the condensing unit compressor onto the at least one threaded mechanical fastener; and
   removably coupling at least one retention member to the at least one threaded mechanical fastener to thereby retain the condensing unit compressor to the selected one of the metal condensing unit base or the plastic condensing unit base;
   whereby the at least one threaded mechanical fastener and the at least one retention member enable the condensing unit compressor to be selectively, interchangeably mountable to either the metal condensing unit base or the plastic condensing unit base;
   wherein assembling the condensing unit compressor onto the at least one threaded mechanical fastener comprises:
      adding at least one grommet to the condensing unit compressor; and
      assembling the at least one grommet and the condensing unit compressor onto the at least one threaded mechanical fastener;
      whereby the at least one retention member removably coupled to the at least one threaded mechanical fastener secures the at least one grommet and the condensing unit compressor to the selected one of the metal condensing unit base or the plastic condensing unit base.

2. The method of claim 1, wherein:
   the at least one threaded mechanical fastener includes four threaded mechanical fasteners; and
   the at least one retention member includes four retention members each configured to be removably coupled to a corresponding one of the four threaded mechanical fasteners.

3. The method of claim 2, wherein the method includes:
   threadedly fastening each of the four threaded mechanical fasteners into the selected one of the metal condensing unit base or the plastic condensing unit base;
   assembling the condensing unit compressor onto the four threaded mechanical fasteners; and
   removably coupling each of the four retention members to the corresponding one of the four threaded mechanical fasteners to thereby retain the condensing unit compressor to the selected one of the metal condensing unit base or the plastic condensing unit base;
   whereby the four threaded mechanical fasteners and the four retention members enable the condensing unit compressor to be selectively, interchangeably mountable to either the metal condensing unit base or the plastic condensing unit base.

4. A method for mounting a condensing unit compressor to either a metal condensing unit base or a plastic condensing unit base, the method comprising:
   selecting one of the metal condensing unit base or the plastic condensing unit base;
   threadedly fastening at least one threaded mechanical fastener into the selected one of the metal condensing unit base or the plastic condensing unit base;
   assembling the condensing unit compressor onto the at least one threaded mechanical fastener; and
   removably coupling at least one retention member to the at least one threaded mechanical fastener to thereby retain the condensing unit compressor to the selected one of the metal condensing unit base or the plastic condensing unit base;
   whereby the at least one threaded mechanical fastener and the at least one retention member enable the condensing unit compressor to be selectively, interchangeably mountable to either the metal condensing unit base or the plastic condensing unit base;
   wherein:
      the at least one threaded mechanical fastener is configured to be self-tapping; and
      threadedly fastening the at least one threaded mechanical fastener into the selected one of the metal condensing unit base or the plastic condensing unit base comprises driving the at least one threaded mechanical fastener into at least one opening in the selected one of the metal condensing unit base or the plastic condensing unit base such that the at least one threaded mechanical fastener forms tapping threads in the at least one opening as the at least one threaded mechanical fastener is driven into the at least one opening.

5. The method of claim 4, wherein assembling the condensing unit compressor onto the at least one threaded mechanical fastener comprises:
   adding at least one grommet to the condensing unit compressor; and
   assembling the at least one grommet and the condensing unit compressor onto the at least one threaded mechanical fastener;
   whereby the at least one retention member removably coupled to the at least one threaded mechanical fastener secures the at least one grommet and the condensing unit compressor to the selected one of the metal condensing unit base or the plastic condensing unit base.

6. A method for mounting a condensing unit compressor to either a metal condensing unit base or a plastic condensing unit base, the method comprising:
   selecting one of the metal condensing unit base or the plastic condensing unit base;
   threadedly fastening at least one threaded mechanical fastener into the selected one of the metal condensing unit base or the plastic condensing unit base;
   assembling the condensing unit compressor onto the at least one threaded mechanical fastener; and
   removably coupling at least one retention member to the at least one threaded mechanical fastener to thereby retain the condensing unit compressor to the selected one of the metal condensing unit base or the plastic condensing unit base;
   whereby the at least one threaded mechanical fastener and the at least one retention member enable the condensing unit compressor to be selectively, interchangeably mountable to either the metal condensing unit base or the plastic condensing unit base;
   wherein threadedly fastening the at least one threaded mechanical fastener into the selected one of the metal condensing unit base or the plastic condensing unit base comprises:

engaging a torque tool with a torque tool reception site of the at least one threaded mechanical fastener; and using the torque tool to drive the at least one threaded mechanical fastener into at least one opening in the selected one of the metal condensing unit base or the plastic condensing unit base.

7. The method of claim 6, wherein:

the torque tool reception site comprises an internal socket along a top of the at least one threaded mechanical fastener; and/or the torque tool reception site comprises a hexagonal portion above a threaded portion of the at least one threaded mechanical fastener.

8. A method for mounting a condensing unit compressor to either a metal condensing unit base or a plastic condensing unit base, the method comprising:

selecting one of the metal condensing unit base or the plastic condensing unit base;

threadedly fastening at least one threaded mechanical fastener into the selected one of the metal condensing unit base or the plastic condensing unit base;

assembling the condensing unit compressor onto the at least one threaded mechanical fastener; and removably coupling at least one retention member to the at least one threaded mechanical fastener to thereby retain the condensing unit compressor to the selected one of the metal condensing unit base or the plastic condensing unit base;

whereby the at least one threaded mechanical fastener and the at least one retention member enable the condensing unit compressor to be selectively, interchangeably mountable to either the metal condensing unit base or the plastic condensing unit base;

wherein:

the at least one threaded mechanical fastener comprises a stud having a threaded lower portion and an upper portion including a groove; and the at least one retention member comprises a clip configured to be engagingly received within the groove along the upper portion of the stud.

9. A method for mounting a condensing unit compressor to either a metal condensing unit base or a plastic condensing unit base, the method comprising:

selecting one of the metal condensing unit base or the plastic condensing unit base;

threadedly fastening at least one threaded mechanical fastener into the selected one of the metal condensing unit base or the plastic condensing unit base;

assembling the condensing unit compressor onto the at least one threaded mechanical fastener; and removably coupling at least one retention member to the at least one threaded mechanical fastener to thereby retain the condensing unit compressor to the selected one of the metal condensing unit base or the plastic condensing unit base;

whereby the at least one threaded mechanical fastener and the at least one retention member enable the condensing unit compressor to be selectively, interchangeably mountable to either the metal condensing unit base or the plastic condensing unit base;

wherein:

the at least one threaded mechanical fasteners comprises a plurality of threaded mechanical fasteners;

the at least one retention member comprises a plurality of retention members; and the method includes:

selecting a first condensing unit compressor from a plurality of condensing unit compressors;

using at least a first threaded mechanical fastener of the plurality of threaded mechanical fasteners and at least a first retention member of the plurality of retention members to mount the first condensing unit compressor to the metal condensing unit base;

selecting a second condensing unit compressor from the plurality of condensing unit compressors having the same configuration as the first condensing unit compressor; and using at least a second threaded mechanical fastener of the plurality of threaded mechanical fasteners and at least a second retention member of the plurality of retention members to mount the second condensing unit compressor to the plastic condensing unit base.

10. A system for mounting a condensing unit compressor to either a metal condensing unit base or a plastic condensing unit base, the system comprising:

at least one threaded mechanical fastener including an upper portion and a lower threaded portion, the lower threaded portion configured to be threadedly fastened into a selected one of the metal condensing unit base or the plastic condensing unit base, the upper portion configured to be received within an opening of the condensing unit compressor when assembled onto the at least one threaded mechanical fastener; and at least one retention member configured to be removably coupled to the upper portion of the at least one threaded mechanical fastener that protrudes outwardly above the condensing unit compressor when assembled onto the at least one threaded mechanical fastener, to thereby retain the condensing unit compressor to the selected one of the metal condensing unit base or the plastic condensing unit base;

whereby the at least one threaded mechanical fastener and the at least one retention member enable the condensing unit compressor to be selectively, interchangeably mountable to either the metal condensing unit base or the plastic condensing unit base.

11. The system of claim 10, wherein the system includes at least one grommet including an opening configured to receive the lower threaded portion of the at least one threaded mechanical fastener therethrough, the grommet configured to be positionable between the condensing unit compressor and the selected one of the metal condensing unit base or the plastic condensing unit base, whereby the at least one retention member removably coupled to the at least one threaded mechanical fastener is operable for securing the at least one grommet and the condensing unit compressor to the selected one of the metal condensing unit base or the plastic condensing unit base.

12. The system of claim 10, wherein:

the at least one threaded mechanical fastener includes four threaded mechanical fasteners; and the at least one retention member includes four retention members each configured to be removably coupled to a corresponding one of the four threaded mechanical fasteners;

whereby the four threaded mechanical fasteners and the four retention members enable the condensing unit compressor to be selectively, interchangeably mountable to either the metal condensing unit base or the plastic condensing unit base.

13. The system of claim 10, wherein the at least one threaded mechanical fastener is configured to be self-tapping such that the at least one threaded mechanical fastener forms tapping threads in at least one opening in the selected one of the metal condensing unit base or the plastic condensing unit base as the at least one threaded mechanical fastener is driven into the at least one opening.

14. The system of claim 10, wherein the at least one threaded mechanical fastener includes a torque tool reception site configured to be engaged by a torque tool for driving the at least one threaded mechanical fastener into at least one opening in the selected one of the metal condensing unit base or the plastic condensing unit base.

15. The system of claim 14, wherein:
the torque tool reception site comprises an internal socket along a top of the at least one threaded mechanical fastener; and/or
the torque tool reception site comprises a hexagonal portion above the lower threaded portion of the at least one threaded mechanical fastener.

16. The system of claim 10, wherein:
the at least one threaded mechanical fastener comprises a stud including the threaded lower portion and the upper portion including a groove; and
the at least one retention member comprises a clip configured to be engagingly received within the groove along the upper portion of the stud.

17. The system of claim 10, wherein:
the at least one threaded mechanical fastener includes four threaded mechanical fasteners;
the at least one retention member includes four clips each configured to be engagingly received within a groove along the upper portion of a corresponding one of the four threaded mechanical fasteners;
the system comprises four grommets, each said grommet including an opening configured to receive the lower threaded portion of a corresponding one of the four threaded mechanical fasteners therethrough, each said grommet configured to be positionable between the condensing unit compressor and the selected one of the metal condensing unit base or the plastic condensing unit base;
each said threaded mechanical fastener is configured to be self-tapping to thereby form tapping threads in a corresponding opening in the selected one of the metal condensing unit base or the plastic condensing unit base as the threaded mechanical fastener is driven into the corresponding opening; and
each said threaded mechanical fastener includes a torque tool reception site configured to be engaged by a torque tool for driving said threaded mechanical fastener into the corresponding opening in the selected one of the metal condensing unit base or the plastic condensing unit base.

18. A condensing unit comprising a metal or plastic base and a compressor mounted to the metal or plastic base by the system of claim 10.

19. A condensing unit comprising a metal or plastic base and a compressor mountable to the metal or plastic base by a plurality of threaded mechanical fasteners and a plurality of retention members, wherein:
each said threaded mechanical fastener includes an upper portion and a lower threaded portion, the lower threaded portion configured to be threadedly fastened into the metal or plastic base, the upper portion configured to be received within an opening of the compressor when assembled onto said threaded mechanical fastener; and
each said retention member configured to be removably coupled to the upper portion of a corresponding one of the plurality of threaded mechanical fasteners that protrudes outwardly above the compressor when assembled onto the threaded mechanical fasteners, to thereby retain the compressor to the metal or plastic base;
whereby the plurality of threaded mechanical fasteners and the plurality of retention members enable the compressor to be selectively, interchangeably mountable to either the metal or plastic base.

20. The condensing unit of claim 19, wherein:
the plurality of threaded mechanical fasteners includes four threaded mechanical fasteners;
the plurality of retention members includes four clips each configured to be engagingly received within a groove along the upper portion of a corresponding one of the four threaded mechanical fasteners;
the condensing unit comprises four grommets, each said grommet including an opening configured to receive the lower threaded portion of a corresponding one of the four threaded mechanical fasteners therethrough, each said grommet configured to be positionable between the condensing unit compressor and the metal or plastic base;
each said threaded mechanical fastener is configured to be self-tapping to thereby form tapping threads in a corresponding opening in the metal or plastic base as the threaded mechanical fastener is driven into the corresponding opening; and
each said threaded mechanical fastener includes a torque tool reception site configured to be engaged by a torque tool for driving said threaded mechanical fastener into the corresponding opening in the metal or plastic base.

21. The condensing unit of claim 19, wherein:
the condensing unit includes a compressor shell that is too close and/or obstructs access to compressor mounting holes of the metal or plastic base thereby inhibiting use of conventional mounting bolts for mounting the condensing unit to the metal or plastic base; and
the plurality of threaded mechanical fasteners and the plurality of retention members are configured to be usable for mounting the compressor to the metal or plastic base despite the compressor shell being too close and/or obstructing access to the compressor mounting holes of the metal or plastic base.

* * * * *